United States Patent [19]

Tiedemann

[11] 4,036,786
[45] July 19, 1977

[54] FLUORINATED CARBON COMPOSITION AND RESISTOR UTILIZING SAME

[75] Inventor: William H. Tiedemann, Cedarburg, Wis.

[73] Assignee: Globe-Union Inc., Milwaukee, Wis.

[21] Appl. No.: 670,985

[22] Filed: Mar. 26, 1976

[51] Int. Cl.² .................................................. H01B 1/06
[52] U.S. Cl. ................................. 252/511; 252/502; 338/308; 423/439; 423/489; 427/103; 428/416; 428/480
[58] Field of Search ........... 252/511, 502; 423/439, 423/489; 338/308; 427/103; 428/480, 416

[56] References Cited

U.S. PATENT DOCUMENTS

| 3,023,390 | 2/1962 | Moratis et al. | 427/103 X |
| 3,439,306 | 4/1969 | Schimmel | 252/511 X |
| 3,457,537 | 7/1969 | Hines | 252/511 X |
| 3,674,432 | 4/1972 | Margrave et al. | 423/439 |
| 3,947,278 | 3/1976 | Youtsey | 252/511 X |

OTHER PUBLICATIONS

Condensed Chemical Dictionary (8th Ed.), 1971, p. 712.

Primary Examiner—Benjamin R. Padgett
Assistant Examiner—E. Suzanne Parr
Attorney, Agent, or Firm—Neuman, Williams, Anderson & Olson

[57] ABSTRACT

A partially fluorinated acetylene black composition, represented by the empirical formula $CF_x$ wherein $x$ has a value of from 0.01 to 0.04, is employed as the conductive component in a composite material resistor to form a high resistance value resistor having excellent temperature coefficient of resistivity, voltage sensitivity and Quantech current noise characteristics.

23 Claims, 3 Drawing Figures

FLUORINATED CARBON COMPOSITION AND RESISTOR UTILIZING SAME

BACKGROUND OF THE INVENTION

1. Field of the Invention

This invention relates to fluorinated carbon compositions, and more particularly, to novel fluorinated carbon compositions employed as the conductive components in composite material resistors.

2. Description of the Prior Art

Fluorinated carbon compositions and methods of preparing fluorinated carbon compositions of various stoichiometrics and empirical formulas are well known. Some of the prior art patents relating to fluorinated carbon compositions and methods for making same include, for example, U.S. Pat. Nos. 2,786,874, 3,536,532 and 3,674,432.

Similarly, composite material resistors and methods of making same are well known in the resistor art. Such resistors may be produced, for example, by: mixing a conductive component, e.g., carbon, with a binder and solvent (an inert filler material may also be added to improve the rheology of the fluid composition); applying the fluid composition to any one of a variety of substrates or surfaces by known techniques, such as screen painting or doctor blading; curing and drying the material to remove the solvent; and affixing electrodes to produce a finished resistor.

It has been recognized that it would be desirable to obtain a composite material resistor having a high resistance value and exhibiting certain properties, such properties including temperature stability of resistance over a wide operating temperature range, linear voltage response and minimal Quantech current noise, measured on a Model 315 instrument manufactured by Quan-Tech Laboratories, Inc. Prior art efforts at producing such a high resistance value, composite material resistor with the aforementioned properties, however, involving altering the composition of composite material resistors through varying the relative proportions of conductive component and noncoductive filler material, that is, lowering the conductive component content and proportionately increasing the filler loading, have not produced entirely efficacious results. To obtain a high resistance value resistor by such alteration, large reductions in the amount of conductive component content are required. Such large reductions of the conductive carbon component used in the prior art resistors by dilution with filler give rise to several problems. Difficulties in controlling the resistance value are experienced as slight changes in the content of the conductive component result in large changes in resistance; increased mixing time is required to insure proper dispersion of particles; and, as a practical matter, a lower limit is reached at which further reduction in the content of the conductive component is not practical since at very low levels the resultant Quantech current Quantech current noise becomes so excessive as to render the resistors commercially unsuitable.

Prior disclosures broadly suggest some of the properties of fluorinated carbon compositions and the efficacy of such properties in other art applications, including the property of fluorinated carbon whereby its resistance may be varied, dependent upon the degree of fluorination, between that of a relatively pure, unfluorinated carbon conductor, and that of an insulator when the carbon is fluorinated to a degree represented by the empirical formula $CF_{1.12}$, or above. There is no indication in the prior art, nor is it recognized by those skilled in the art, however, that the carbon conductive component in a composite material resistor may be fluorinated to provide a high resistance value resistor which exhibits the aforesaid desired resistor properties.

SUMMARY OF THE INVENTION

The invention comprises resistor compositions, particularly resistor compositions which employ a partially fluorinated carbon black composition represented by the empirical formula $CF_x$ wherein $x$ has a value of up to 0.2 which, when employed as the conductive component in a composite material resistor, provides a high resistance value resistor having excellent temperature coefficient of resistivity, voltage sensitivity and Quantech current noise characteristics.

Objects of the Invention

Accordingly, it is an object of this invention to provide a partially fluorinated carbon composition for the conductive component of a composite material resistor.

It is still another object of this invention to provide a partially fluorinated carbon composition for the conductive component of a composite material resistor whereby a resistor having a high resistance value can be obtained.

It is still another object of this invention to provide a partially fluorinated carbon composition for the conductive component of a composite material resistor whereby a resistor having improved resistivity, temperature coefficient of resistivity, voltage response and Quantech current noise characteristics heretofore concurrently unattainable using unfluorinated carbon conductors can be obtained.

A still further object of this invention is to provide a composite material resistor having a partially fluorinated carbon composition as the conductive component whereby a high resistance value controlled within close tolerances can be obtained by moderate dilution with nonconductive filler.

Other objects and advantages of the invention will become apparent upon reading the following description and the appended claims, and upon reference to the accompanying drawings.

DESCRIPTION OF THE PREFERRED EMBODIMENTS

Figure 1:
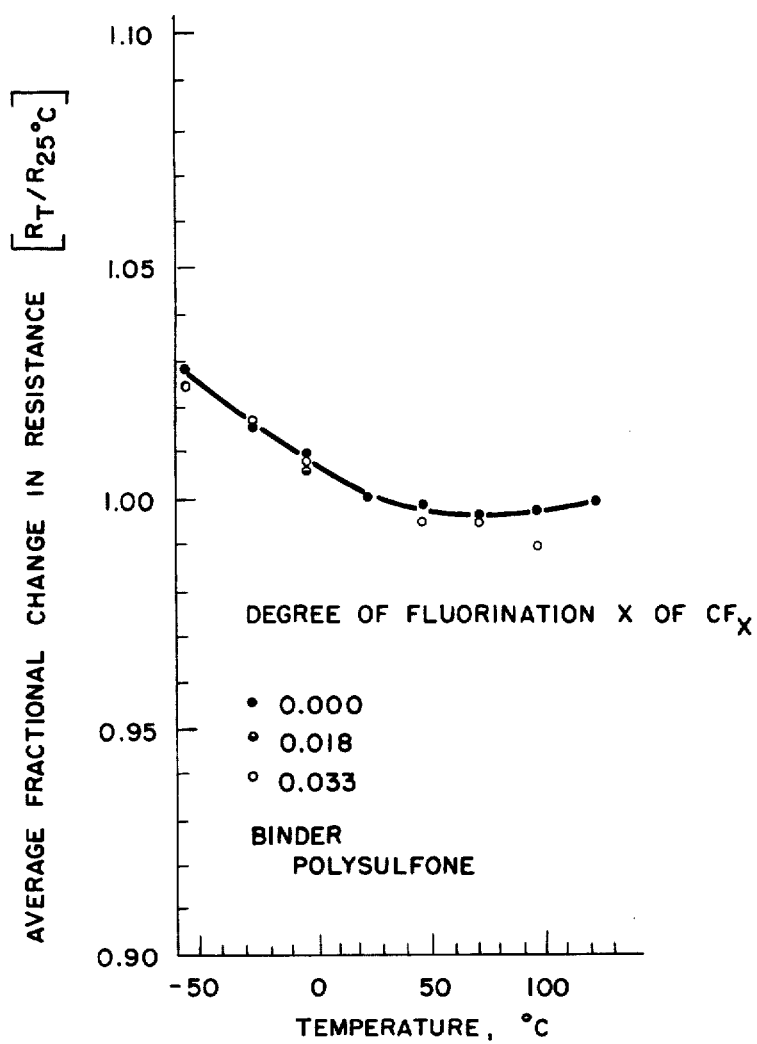
FIG. 1 is a graph of resistance for composite material resistors having conductive components of fluorinated carbon compositions according to this invention (normalized to resistance at 25° C.) versus temperature.

The present invention includes composite resistor compositions and resistors made thereform, including particularly, compositions which contain as the essential conductive component a novel partially fluorinated carbon. By partially fluorinated carbon it is meant to include compositions wherein the carbon has been sufficiently fluorinated to significantly increase the specific resistance of the carbon as compared to the specific resistance for unfluorinated carbon.

The compositions employing the novel fluorinated carbon also include a binder-filler component which may be a single component such as an inert, non-conductive resin, exemplary of which is a polysulfone resin or polymer. The binder-filler may also include, in addition to the resinous binder, an inert, non-conductive solid filler in particulate form such as, for example, finely divided silica (sold as an Aerosil) or finely divided alumina.

The resistive compositions of the invention which employ partially fluorinated carbon as the conductive component are intended to provide higher resistance levels and at the same time provide a resistor with improved properties such as stable temperature coefficient of resistivity, linear voltage response and minimal Quantech current noise. The prior art practice in composite resistor manufacture was to dilute the conductive component content by the use of non-conductive binder or binder and inert filler in an attempt to increase the resistance value.

The difficulty encountered in such practices was that the temperature coefficients, linearity voltage response and Quantech current noise would be at detrimental and unacceptable levels when the conductive element or component (carbon black) was highly diluted. By the use of the partially fluorinated carbon of the present invention, which has a higher specific resistance than pure carbon (acetylene) black, resistors having the desired higher resistance levels, may be produced at lower dilutions of the conductive component (partially fluorinated carbon black) than would be the case if pure carbon black was used as the conductor. This higher or improved resistivity of the resistor compositions of the present invention is achieved without substantial detrimental effect on the desired properties noted above. The capacity to achieve a greater resistivity at a given dilution in a resistor element formed using a partially fluorinated carbon black compared with a similar resistor using acetylene black as the conductive component, is expressed as a resistive efficiency ratio, $R_{eff}$.

More particularly, $R_{eff}$ is the ratio of the measured resistance of a resistor employing a partially fluorinated carbon ($CF_x$) as the conductive element at a particular dilution with respect to binder-filler, designated: $R_{CF_x}$, compared with another resistor at the same dilution and of the same dimensions using pure acetylene black as the conductive component, designated $R_{AB}$. Mathematically, the ratio is expressed as:

$$R_{eff} = \frac{R_{CF_x}}{R_{AB}}$$

The present invention is intended to include resistor compositions where $R_{eff}$ is greater than unity.

In general, binder and filler materials, solvents and methods of making and utilizing composite material resistors where carbon is the conductor are well known in the art, and it is intended to include these well known techniques herein by reference U.S. Pat. Nos. 3,328,317, 3,686,139 and 3,907,717.

The fluorinated carbon black employed in the composite material resistor compositions of the invention is a partially fluorinated carbon, more particularly, in the most preferred embodiment, a finely divided, pulverulent, partially fluorinated acetylene black composition. Acetylene black is a commercially available, finely divided, low oil emitent, relatively pure carbon black produced by the self-sustaining, thermal decomposition of acetylene at atmospheric pressure and elevated temperatures, e.g., 800° C. The acetylene black that has been used to prepare the compositions of the invention is the commercial acetylene black RM 500, Gulf Shawinigan Glack (Gulf Oil Co.). Other carbon sources, however, may also be used, if desired, which will produce similar characteristics when partially fluorinated.

Fluorination of the carbon, specifically the preferred acetylene black, follows well known prior art methods, basically involving reacting fluorine gas with the acetylene black at elevated pressures and/or temperatures to impart kinetic energy to the carbon and fluorine atoms to form carbon-fluorine bonds. The process is generally described in U.S. Pat. Nos. 2,786,874, 3,536,532 and 3,674,432.

The partially fluorinated particulate carbon black used in the present invention is prepresented by the empirical formula $CF_x$ where $x$ has a value of up to 0.2, more particularly, in the most preferred embodiment, where $x$ has a value of from 0.01 to 0.04. The use of this material permits one to obtain a high resistance value resistor which exhibits other desired characteristics. The partially fluorinated carbon black, used as conductive component in resistor compositions, has a higher resistivity than carbon black. This increased resistivity permits the use of a higher proportion of the conductive component in a high resistance value resistor, and at the same time provides improved properties.

The excellent resistor characteristics exhibited by composite material resistors which use the novel, partially fluorinated carbon conductive component compositions of this invention are apparent from FIGS. 1 and 2 and Table 1 below.

Table 1 illustrates specific examples of the increased resistance $R_{eff}$ values which can be obtained over a wide range of formulations by the use of partially fluorinated acetylene blacks as the conductive component in admixture with the nonconductive binder-filler of a composite resistor. The $R_{eff}$ values tabulated in Table 1 are observed resistance for composite material resistors of a specified content of partially fluorinated acetylene black conductive component of a given degree of fluorination ($CF_x$ wherein $x = 0.018$ and 0.033) divided by the resistance of unfluorinated acetylene black composite material resistors of corresponding conductive component content. An increase in resistance of a factor of two or three can be obtained at a fluorination level of $CF_{0.033}$ for the range of from 2 to 40, preferably from 8 to 35, weight percent of conductive component contents. The following general example illustrates generally the preparation of composite material resistors having partially fluorinated carbon conductive component compositions according to this invention and illustrated in FIGS. 1 and 2 and in the examples of Table 1, post.

EXAMPLE

Acetylene black RM 500 is fluorinated within the range represented by the empirical formula $CF_x$ wherein $x$ has a value of up to 0.2, particularly 0.018 and 0.033.

A binder-filler solution is prepared by dissolving 20 grams of polysulfone resin in 80 grams of acetophenone (stirring for 8 to 10 hours is usually required).

A resistor ink is prepared by placing a desired weight of binder-filler solution on a roller mill (roller spacing, front 0.004 inch, back 0.005 inch) and adding a required weight of the partially fluorinated acetylene black conductive component to the binder-filler solution on the rollers. Various proportions of polymer solids are mixed with the partially fluorinated carbon to achieve the desired resistance value in the final resistor, constrained only by Quantech current noise which increases as the conductive component $CF_x$ content decreases. The resistor ink composition is milled for at least six minutes prior to application to the substrate.

A termination (terminal attachment point) ink is prepared in a similar manner as the resistor ink by milling 91 weight percent silver powder with 9 weight percent solution of polysulfone resin in acetophenone.

Figure 3:
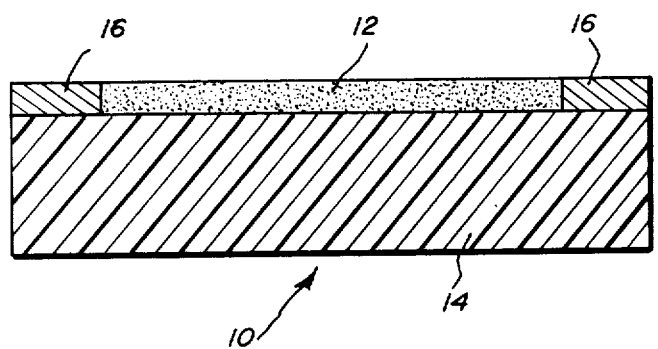
FIG. 3 is a cross-sectional view of a composite material resistant element according to this invention.

A resistor 10 (FIG. 3) is prepared by doctor blading a one-inch by 0.5 inch pattern of resistor ink 12 onto a 0.002 inch insulating, non-conductive substrate 14, specifically a sheet formed of polyethylene terephthalate sold as MYLAR by the DuPont Co., using a 0.008 inch thick mask to provide a layer of wet ink 0.008 inch thick. After printing, the resistor is heated to 50° C. for 50 minutes. End terminations for the resistor are prepared by subsequently doctor blading termination ink 16 coatings onto the resistor terminal areas and heating to 50° C. for 50 minutes to drive off the solvent.

The $R_{eff}$ values of specific examples of composite material resistors prepared as above using $CF_{0.018}$ and $CF_{0.033}$ are set forth in Table 1.

TABLE 1

| Ex. | Weight % of Fluorinated Acetylene Black Conductive Component | Weight % Polysulfone Binder/Filler | $R_{eff}$* Degree of Fluorination of the Acetylene Black $CX_x$ Conductive | |
|---|---|---|---|---|
| | | | A $x = 0.018$ | B 0.033 |
| 1 | 8 | 92 | 2.39 | 3.99 |
| 2 | 10 | 90 | 2.13 | 3.28 |
| 3 | 12 | 88 | 1.80 | 2.78 |
| 4 | 15 | 85 | 1.60 | 2.48 |
| 5 | 20 | 80 | 1.60 | 2.37 |
| 6 | 25 | 75 | 1.68 | 2.38 |
| 7 | 30 | 70 | 1.31 | 2.03 |
| 8 | 35 | 65 | 1.22 | 1.58 |

*$R_{CFx}/R_{AB}$

Figure 2:
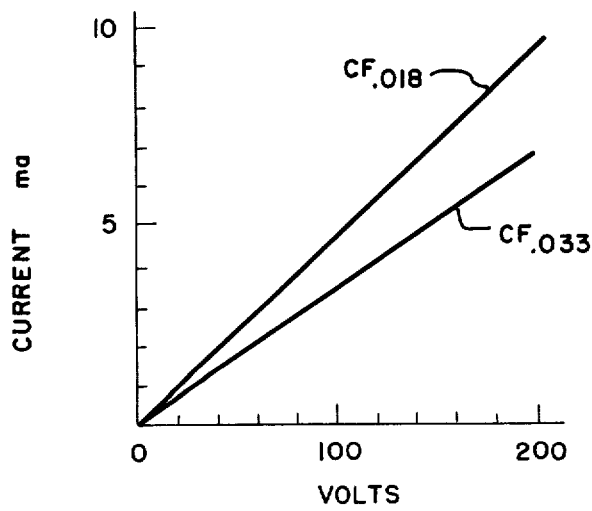
FIG. 2 is a graph of current versus voltage for composite material resistors having conductive components of fluorinated carbon compositions according to this invention.

FIGS. 1 and 2 illustrate the stable temperature coefficient of resistivity and linear voltage response characteristics which can be obtained for high resistance value, fluorinated acetylene black, composite material resistors prepared as in the above examples according to this invention.

The temperature coefficients of resistance for resistors employing partially fluorinated acetylene black compositions $CF_{0.018}$ and $CF_{0.033}$ are seen in FIG. 1 to be essentially that of pure acetylene black, also shown in the graph.

The voltage responses for resistors employing partially fluorinated acetylene black compositions $CF_{0.018}$ and $CF_{0.033}$ are seen in FIG. 2 to be essentially linear, that is, the resistance values for such resistors remain constant over the voltage gradiant shown (0–200 volts).

In order to realize fully the advantages of the present invention, it is necessary that the conductive component of the composite material resistor be a carbon black, preferably an acetylene black fluorinated to a degree within the range represented by the empirical formula $CF_x$ where $x$ has a value of from 0.01 to 0.04. The high resistance values and excellent characteristics of resistors obtained are considered to be attributable to the fact that fluorination within the aforesaid range results only in partial surface fluorination of the carbon black conductive component, such that the desired higher resistance value, partially fluorinated carbon compositions are obtained while concomitantly retaining all the beneficial effects associated with the physical geometry of carbon black.

The partially fluorinated carbons used in the present inventions also provide other properties beneficial to resistor art applications, e.g., such fluorinated carbons are hydrophobic and, therefore, insensitive to the presence of moisture. They are also thermally stable up to 600° C. and chemically insoluble in and resistant to attack by common solvents such as acetone, butyl-Cellosolve (glycol ethyl ether), trichloroethylene, methyl ethyl ketone and methyl acetate. Further, the partially fluorinated carbons of the invention are infusible and stable both in pure oxygen or in a high vacuum at temperatures of 100° F. or higher.

Thus, it will be seen that a combination of properties far superior to those attainable by use of the conventional carbon conductive components of the prior art are provided by the novel partially fluorinated carbon composition of the invention when utilized as the conductive component in a composite material resistor.

While particular embodiments of the invention have been shown, it will be understood, of course, that the invention is not limited thereto since modifications may be made by those skilled in the art, particularly in the light of the foregoing teachings. It is, therefore, contemplated by the appended claims to cover any such modifications as incorporate those features which constitute the essential features of these improvements within the true spirit and scope of the invention.

What is claimed is:

1. As a new composition of matter, a composition capable of functioning as the conductive component of a composite material electrical resistant element having excellent temperature coefficient of resistivity, voltage sensitivity and current noise characteristics, said composition comprising a finely divided, partially fluorinated carbon having the empirical formula $CK_x$ wherein $x$ has a value ranging from between about 0.01 and 0.04.

2. A composition according to claim 1 wherein the carbon compound is an acetylene black.

3. A composite, electrical resistive element composition characterized by high resistivity, stable temperature coefficient of resistivity, linear voltage response and minimal current noise which comprises a current-conductive component of partially fluorinated carbon having the empirical formula $CG_x$ wherein $x$ has a value of up to 0.2 and an inert, nonreactive, non-conductive binder-filler.

4. A composition according to claim 3 wherein $x$ has a value of from 0.01 to 0.04.

5. A composition according to claim 3 wherein the partially fluorinated carbon is a partially fluorinated acetylene black.

6. A composition according to claim 3 wherein the binder-filler is a polysulfone resin.

7. A composition according to claim 3 having a resistive efficiency ratio, $R_{eff}$, greater than unity.

8. A composition according to claim 3 wherein the ratio of inert, non-conductive binder-filler and partially fluorinated carbon is such that the partially fluorinated carbon constitutes from about 2 to about 40 weight percent of the said components.

9. A composition according to claim 3 wherein $x$ is 0.018.

10. A composition according to claim 3 wherein $x$ is 0.033.

11. A composite electrical resistance element having high resistivity and superior temperature coefficient of resistivity, voltage response and current noise characteristics, which comprises a non-conductive, insulating, monolithic substrate, a resistive-conductive material coating applied at a predetermined thickness and area to a surface of the substrate and termination sectors for affixing a conductor thereto, said coating comprising a composition including as the essential conductive component, a partially fluorinated carbon represented by the formula $CF_x$ wherein $x$ has a value of up to 0.2, and an inert, non-conductive binder-filler diluent material intimately admixed with said conductive component.

12. A resistor according to claim 11 wherein $x$ has a value of from 0.01 to 0.04.

13. A resistor according to claim 11 wherein the conductive component is a partially fluorinated acetylene black and the binder-filler is a polysulfone resin.

14. A resistor according to claim 11 wherein the partially fluorinated conductive component of the resistive composition constitutes up to about 35 weight percent of the composition of conductive component and binder-filler.

15. A resistor according to claim 11 wherein the termination sector is formed from a coating of finely divided metal.

16. The resistor according to claim 11 wherein the non-conductive substrate is a flat sheet of polyethylene terephthalate polymer.

17. A resistor accoring to claim 11 having a resistive efficiency ratio $R_{eff}$ as determined by the expression $R_{eff} = R_{CF_X}/R_{ab}$, wherein $R_{CF_X}$ is the resistance of a resistor containing as the conductive component a predetermined proportion of partially fluorinated acetylene black and $R_{AB}$ is the resistance of a resistor with the same proportion of pure acetylene black as the conductive component, greater than unity.

18. In a composite carbon black base electrical resistance element comprising a non-conductive substrate and a resistive-conductive coating of inert, non-conductive binder-filler material and a finely divided carbonaceous conductive material in the form of a coating adhered to the substrate, the improvement comprising employing as the conductive carbonaceous component a partially fluorinated carbon black having the empirical formula $CF_x$, wherein $x$ has a value of up to 0.2.

19. A resistor according to claim 18 wherein $x$ has a value of from 0.01 to 0.04.

20. A resistor according to claim 18 wherein the conductive component is a partially fluorinated acetylene black.

21. A composite, electrical resistive ink composition characterized by high resistivity and excellent temperature coefficient of resistivity, voltage response and current noise characteristics when applied to and dried on an inert, non-conductive substrate surface which comprises a resinous, non-conductive binder-filler material, a volatile organic solvent and, as a conductive component, a partially fluorinated acetylene black having the empirical formula $CF_x$ wherein $x$ has a value of from 0.01 to 0.04.

22. An ink according to claim 21 wherein the binder-filler is a polysulfone resin.

23. A method of making a composite carbonaceous base electrical resistor which comprises:
   a. forming an admixture of a finely divided, inert, non-conductive resinous binder-filler material, a conductive finely divided, partially fluorinated carbon having the empirical formula $CF_x$ wherein $x$ has a value of from 0.01 to 0.04, and an inert volatile organic solvent;
   b. grinding the slurry mixture so formed to provide a homogeneous, uniform slurry admixture of the said components;
   c. coating the slurry composition at a predetermined thickness and area to a non-conductive substrate surface;
   d. drying the coating so applied to remove the volatile solvent;
   e. preparing a termination ink comprising an admixture of finely divided conductive metal and inert, non-conductive resin in an organic solvent and mixing the admixture to provide a uniform suspension;
   f. coating the termination ink to predetermined sectors of the dried resistive coating applied to the substrate; and
   g. drying the termination ink coatings to remove the volatile organic solvent.

* * * * *